United States Patent Office 3,631,188
Patented Dec. 28, 1971

3,631,188
PRODUCTION OF ALDEHYDE CARBOXYLIC ACID OR ALDEHYDE AND CARBOXYLIC ACID
Hachiro Wakamatsu, Tokyo, Nobuyuki Yamagami, Kawasaki, and Jyunko Furukawa, Tokyo, Japan, assignors to Ajinomoto Co., Inc., Tokyo, Japan
No Drawing. Filed Mar. 4, 1970, Ser. No. 16,590
Claims priority, application Japan, Apr. 7, 1969, 26,696/69
Int. Cl. C08h 17/36
U.S. Cl. 260—413
8 Claims

ABSTRACT OF THE DISCLOSURE

A process for preparing aldehyde carboxylic acid or a mixture of an aldehyde and a carboxylic acid by heating an intramolecular or intermolecular carboxylic acid anhydride with synthesis gas under pressure in the presence of a cobalt carbonyl catalyst. A solvent which is strongly nucleophilic towards the catalyst may optionally be present during the reaction. A tertiary amine or a halide salt may be added to the reaction mixture to repress decomposition of the catalyst.

BACKGROUND OF THE INVENTION

Field of the invention

This invention relates to a process for the hydrogenation of an acid anhydride, and more particularly, to a process for hydrogenating an intramolecular, i.e., a cyclic, or an intermolecular, i.e., an acyclic, anhydride to form the corresponding aldehyde carboxylic acid or a mixture of an aldehyde and a carboxylic acid.

Description of prior art

Many reactions to synthesize aldehydes from carboxylic acid derivatives are known, such as, for example, Rosenmund's reaction of acid chlorides, and hydrogenation of acid imides, N-alkyl acid amides, thiol acid esters, acid hydrazides or nitriles under specific conditions. However, it is unknown prior to the present invention to simultaneously form an aldehyde and a carboxylic acid by hydrogenating an acid anhydride. There is one report on the hydrogenation of acid anhydrides. In (Chem. Ber., 95, 1844 1962)), there is disclosed a process for hydrogenating acetic anhydride in the presence of a palladium catalyst supported on a barium sulfate carrier for 120 hours at room temperature and at atmospheric pressure. The results of that process, however, is the formation of a large quantity of alcohol and only a minor amount of acetaldehyde, which renders the process essentially valueless for most industrial applications.

SUMMARY OF THE INVENTION

According to the present invention, an intramolecular or intermolecular anhydride is hydrogenated by heating the anhydride with synthesis gas under pressure in the presence of a cobalt carbonyl catalyst. The reaction of this invention is a novel one and can be shown by the following equations:

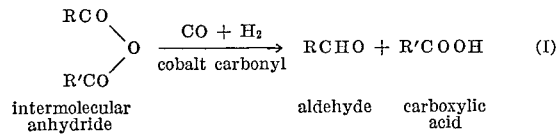

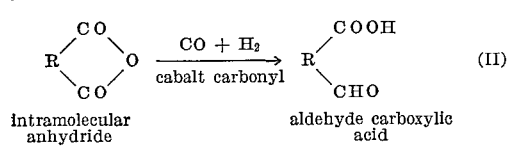

By using an intermolecular anhydride as a starting material, the corresponding mixture of an aldehyde and a carboxylic acid are formed simultaneously (Equation I). When an intramolecular anhydride is used, the corresponding aldehyde carboxylic acid is obtained (Equation II).

DESCRIPTION OF PREFERRED EMBODIMENTS

A wide variety of acid anhydrides can be used in the present process, including both intramolceular, or cyclic anhydrides and intermolecular, or acylic anhydrides. For example, suitable anhydrides include the symmetrical acid anhydrides, such as acetic anhydride, propionic anhydride, butyric anhydride, isobutyric anhydride, caproic anhydride, valeric anhydride, stearic anhydride, palmitic anhydride, benzoic anhydride and toluic anhydride; the mixed anhydrides, such as acetic-benzoic anhydride, acetic-palmitic anhydride and caproic-palmitic anhydride; and the intramolecular anhydrides, such as succinic anhydride, glutaric anhydride and phthalic anhydride.

Although a liquid acid anhydride can be hydrogenated without a solvent, the reaction of this invention can also be carried out in the presence of a solvent regardless of whether the acid anhydride is in a solid state or a liquid state. The solvent preferably is a polar solvent such as tetrahydrofuran, dioxane, ethyl acetate, chlorobenzene, ether, acetone, acetonitrile, acetic acid, benzonitrile, N-methylpyrolidone and t-butanol. The solvent should also preferably be strongly nucleophilic towards the cobalt carbonyl catalyst for increased reaction rate and good conversion ratios. A nonpolar solvent like benzene can also be used, however, if a strongly nucleophilic compound toward the cobalt carbonyl catalyst, such as pyridine, is also added as a co-catalyst.

Any catalyst which is soluble in the liquid reaction mixture and is known as a catalyst for various oxo reactions (hydroformylation reactions), will also be effective for this reaction. For example, good catalysts include dicobalt octacarbonyl, and cobalt carbonyl complexes having (trialkyl or triallyl)-phosphine, -arsine or -stibine ligands. The concentration of the catalyst may be from 0.5 g./l. to 3.0 g./l. based on the cobalt metal.

By conducting the reaction, the acid anhydride, the cobalt carbonyl catalyst and, if desired, the solvent, is pressurized with the synthesis gas and the mixture is heated. The carbon monoxide component of the synthesis gas provides the important function of stabilizing the catalytic activity of the cobalt carbonyl catalyst.

The pressure of the synthesis gas is raised until the partial pressure of the carbon monoxide reaches 20 to 200 kg./cm.$^2$. The ratio of hydrogen to carbon monoxide in the synthesis gas is from about 0.5 to 8.0. When the partial pressure of carbon monoxide to too low, the cobalt carbonyl catalyst may be decomposed to form an inert cobalt compound which is insoluble in the reaction mixture. It is, therefore, important that the partial pressure be selected in accordance with the particular acid anhydride used as a starting material, so as to avoid catalyst inactivation and to increase the reaction rate.

In order to further repress the decomposition of the cobalt catalyst and to increase the reaction rate, a tertiary amine, such as pyridine, pyrazine, lutidine, picoline, collidine, triethylamine, N,N-dimethylaniline or N,N-dimethyl-o-toluidine, can be employed in an amount of between 0.05–1.2 moles per mole of catalyst. For the same purpose a halogen compound such as sodium iodide, potassium iodide, calcium iodide, manganese iodide, cobalt iodide, potassium bromide or cobalt bromide, can also be employed in an amount of from one to several moles per mole of the catalyst, if desired.

Although the most favorable reaction temperature varies according to the particular acid anhydride and the particular solvent, if one is used, good results have been obtained within the range of 100–200° C., and particularly between 110–160° C. When the temperature is too high, side-reactions tend to occur such that the aldehyde formed is further reduced to an alcohol. Thus it is desirable to use the above-mentioned additive, such as pyridine or sodium iodide, to increase the reaction rate without raising the reaction temperature.

After the termination of the reaction, the cobalt catalyst can be recovered by the methods known to separate the catalyst in the oxo reaction. The aldehyde and the carboxylic acid are isolated by usual separation techniques.

When obtaining an acid anhydride by dehydration of a monocarboxylic acid, the corresponding aldehyde and the original carboxylic acid will be formed by this reaction. Thus, all of the starting monocarboxylic acid used can be converted to the corresponding aldehyde by subjecting the monocarboxylic acid, after the recovery of the aldehyde, to dehydration and to hydrogenation of the acid anhydride formed. Further, when a cyclic acid anhydride (intramolecular anhydride) derived from a dicarboxylic acid, is used, in the subject process, the corresponding aldehyde carboxylic acid will be obtained. Thus, this invention has many industrial applications. For example, by treating a long chain monocarboxylic acid, by the methods of this invention, the corresponding amino acid having a specific activity is obtained via the corresponding aldehyde. β-Formylpropionic acid and γ-formylbutylic acid can be derived from succinic acid and glutaric acid, respectively, which are obtained by the liquid phase air oxidation of cyclohexane. The above-mentioned aldehyde carboxylic acids can easily be further converted to glutamic acid and lysine, respectively. As indicated above, the acid anhydride may be monocarboxylic, dicarboxylic, or polycarboxylic, and may be either cyclic or acyclic in structure.

The following examples illustrate the invention. In every example, a stainless steel autoclave of 100 ml. capacity equipped with an electromagnetic stirrer is used as the reactor.

EXAMPLE 1

50 ml. of acetic anhydride (530 millimole) and 330 mg. of dicobalt octacarbonyl were charged into a reactor. Synthesis gas ($CO:H_2=1:2$) was fed into the reactor until the gas pressure was 220 kg./cm.$^2$. The reaction mixture was then heated with stirring. The temperature was raised from 120° C. to 190° C. over a period of 10 minutes, and the gas was absorbed to 100 kg./cm.$^3$ during the heating period. After the mixture was cooled, a dark reddish clear solution was obtained. The compound having a boiling point of 118° C. was separated from the solution by rectification, and was identified as pure acetic acid by the use of infrared spectrum and NMR spectrum. The amount of acetic acid formation was 185 millimoles. 137 millimoles of ethylidene diacetate was also obtained, which was identified by means of gas chromatography. The total carbonyl content in the product was 137 millimoles, which was isolated as 2,4-dinitrophenylhydrazone. This hydrazone was derived from acetaldehyde, which was confirmed by its melting point (148° C.), mixed examination, thin layer chromatography, infrared spectroscopy and elemental analysis.

EXAMPLE 2

30 ml. of propionic anhydride (230 millimoles) and 300 mg. of diocobalt octacarbonyl were charged into a reactor. Synthesis gas ($CO:H_2=1:1$) was fed into the reactor until the gas pressure was 200 kg./cm.$^2$. The reactor was heated to 130° C. with stirring for 2 hours and 40 minutes. The mixture was then cooled. A dark reddish clear solution was then obtained. On rectification of part of the solution, a compound having a boiling point of 141° C. was obtained. This compound was identified as pure propionic acid by means of NMR spectroscopy. 171 millimoles of propionic acid (yield: 74%) was formed in the total reaction mixture.

Propionaldehyde was isolated from part of the reaction solution as its 2,4-dnitrophenyl hydrazone, which was identified by its melting point (153–4° C.), mixed examination, thin layer chromatography and elemental analysis. The amount of the formation of propionic aldehyde was 114 millimoles in the total reaction mixture (yield: 50%).

EXAMPLE 3

A mixture of 20 g. of stearic anhydride (44 millimoles) dissolved in 75 ml. of acetone and 450 mg. of dicobalt octacarbonyl was charged into a reactor. Synthesis gas ($CO:H_2=1:1$) was fed into the reactor until the gas pressure was 200 kg./cm.$^2$. The reaction mixture was stirred at 130° C. for 1 hour and 45 minutes. The solution was changed to dark red, in which a part of the stearic anhydride was found in the crystalline state. After the solvent was removed from a part of the resultant, stearic acid was separated via its sodium salt, which was identified by its melting point (69–70° C.), infrared spectrum and mixed melting point. It was confirmed that 43 millimoles of stearic acid was formed (yield: 98%). Stearic aldehyde was also separated from part of the solution as its 2,4-dinitrophenylhydrazone, which was identified by its melting point (101–3° C.), mixed melting point, infrared spectrum and thin layer chromatogram. It was confirmed thereby that 25 millimoles of stearic aldehyde was formed in the total reaction solution (yield: 57%).

EXAMPLE 4

22.6 g. of benzoic anhydride (100 millimoles) was dissolved in 75 ml. of acetone, and 450 mg. of dicobalt octacarbonyl was added thereto. The above solution was charged into a reactor, and a synthesis gas ($CO:H_2=1:1$) was fed into a reactor until the gas pressure was 200 kg./cm.$^2$. The reaction solution was stirred at 130° C. for 4 hours and 15 minutes. After the solvent was removed from a part of the dark reddish and clear reaction mixture, benzoic acid was separated via its sodium salt, which was identified by its melting point (121–2° C.), mixed melting point and infrared spectrum. 111 millimoles of bonzoic acid was formed in the reaction mixture. The solvent was also removed from a part of the reaction mixture and then benzaldehyde was separated as its 2,4-dinitrophenylhydrazone, which was identified by its melting point (238–9° C.), mixed melting point and thin layer chromatogram. It was observed that 33 millimoles of benzaldehyde (yield: 33%), 7 millimoles of benzyl benzoate (yield: 7%), and a minor amount of benzyl alcohol was formed.

EXAMPLE 5

A mixture of 10 g. of succinic anhydride (100 millimoles) dissolved in 43 ml. of dioxane, 0.24 g. of pyridine (3 millimoles) and 300 mg. of dicobalt octacarbonyl was added to a reactor. Carbon monoxide and hydrogen was fed into the reactor until their respective partial pressures were 30 kg./cm.$^3$ and 170 kg./cm.$^2$.

The reaction mixture was heated to 130° C. with stirring for 41 hours. The acid fraction was collected from the reddish yellow and clear solution, and β-formylpropionic acid was separated as its 2,4-dinitrophenylhydrazone, which was identified by its melting point (201° C.), mixed melting point, infrared spectrum and thin layer chromatogram. The amount of aldehyde acid was 26.3 millimoles. As the result of gas chromatographic analysis, it was confirmed that 45 millimoles of unreacted succinic anhydride existed in the reaction solution. Thus, the yield of β-formylpropionic acid based on succinic anhydride consumed was 48%.

EXAMPLE 6

In a modification of Example 5, 11.4 g. of glutaric anhydride (100 millimoles) was used instead of succinic anhydride. The reaction time was 4.5 hours. The reacted solution was pale yellow and clear, and the acid fraction was collected therefrom. γ-Formylbutylic acid was separated as its 2,4-dinitrophenylhydrazone, which was identified by means of NMR spectroscopy, elemental analysis and thin layer chromatography. It was confirmed thereby that 32 millimoles of γ-formylbutylic acid was formed in the reaction mixture.

It should be apparent to one of ordinary skill in the art that many modifications and changes can be made to the present invention without departing from its spirit and scope thereof.

What is intended to be claimed and protected by Letters Patent is:

1. A process for preparing an aldehyde carboxylic acid or a mixture of an aldehyde and a carboxylic acid from an intramolecular or intermolecular carboxylic acid anhydride, which comprises:

heating said anhydride in the presence of a cobalt carbonyl catalyst and a synthesis gas for a time sufficient such that when said anhydride is an intramolecular carboxylic acid anhydride, an aldehyde carboxylic acid is formed and when said anhydride is an intermolecular carboxylic acid, a mixture of an aldehyde and a carboxylic acid is formed.

2. A process of claim 1, wherein the reactants are admixed in a polar solvent which is strongly nucleophilic to the catalyst.

3. The process of claim 1, wherein the reaction is effected in the presence of a tertiary amine to facilitate the reaction.

4. The process of claim 1, wherein the reaction is effected in the presence of a halogen salt selected from the group consisting of sodium iodide, potassium iodide, calcium iodide, manganese iodide, cobalt iodide, potassium bromide, and cobalt bromide.

5. The process of claim 1, wherein said anhydride is an intramolecular carboxylic acid anhydride.

6. The process of claim 1, wherein said anhydride is an intermolecular carboxylic acid anhydride.

7. The process of claim 1, wherein the catalyst is used in a concentration of 0.5 g./l. to 3.0 g./l. based on the cobalt metal, the synthesis gas is used at a carbon monoxide partial pressure of from 20–200 kg./cm.$^2$ and the temperature of the reaction is between 100° C. and 200° C.

8. The process of claim 7, wherein the ratio of hydrogen to carbon monoxide in the synthesis gas is between 0.5 to 8.0.

References Cited

UNITED STATES PATENTS

| | | | |
|---|---|---|---|
| 2,063,365 | 12/1936 | Conover | 260—540 X |
| 3,524,877 | 8/1970 | Haage et al. | 260—515 |

LEWIS GOTTS, Primary Examiner

E. G. LOVE, Assistant Examiner

U.S. Cl. X.R.

260—515 R, 526 R, 540, 541, 599, 601 R